US009564128B2

(12) United States Patent
Park et al.

(10) Patent No.: US 9,564,128 B2
(45) Date of Patent: Feb. 7, 2017

(54) CONTROLLING A SPEECH RECOGNITION PROCESS OF A COMPUTING DEVICE

(71) Applicant: QUALCOMM Incorporated, San Diego, CA (US)

(72) Inventors: KeeHyun Park, San Diego, CA (US); Hsuan-Hsu Cheng, San Diego, CA (US); Aravind Sankaran, San Diego, CA (US); Parashuram Kadadi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 350 days.

(21) Appl. No.: 14/100,934

(22) Filed: Dec. 9, 2013

(65) Prior Publication Data

US 2015/0161998 A1 Jun. 11, 2015

(51) Int. Cl.
*G10L 15/00* (2013.01)
*G10L 15/20* (2006.01)
(Continued)

(52) U.S. Cl.
CPC ............... *G10L 15/22* (2013.01); *G10L 15/24* (2013.01); *G10L 25/78* (2013.01); *G10L 2015/226* (2013.01)

(58) Field of Classification Search
None
See application file for complete search history.

(56) References Cited

U.S. PATENT DOCUMENTS 4,597,098 A * 6/1986 Noso ....................... G10L 25/87 360/15
4,696,031 A * 9/1987 Freudberg ............. H04Q 1/457 379/209.01

(Continued)

FOREIGN PATENT DOCUMENTS

EP 1345210 A2 9/2003
EP 1503368 A1 2/2005

(Continued)

OTHER PUBLICATIONS

Kumar S., et al., "EMG based voice recognition," Proceedings of the Intelligent Sensors, Sensor Networks and Information Processing Conference, 2004, pp. 593-597.

(Continued)

*Primary Examiner* — Richemond Dorvil
*Assistant Examiner* — Thuykhanh Le
(74) *Attorney, Agent, or Firm* — The Marbury Law Group, PLLC

(57) ABSTRACT

Methods, systems and devices are provided for controlling a speech recognition process on a computing device. A computing device may receive audio signals from a microphone and muscle movement signals from a muscle movement detector, such as an electromyography sensor. The computing device may determine whether the audio signals satisfy an audio characteristic criterion indicative of speech and whether the head muscle activity signals satisfy a muscle movement criterion indicative of the user speaking. The computing device may perform voice recognition processing on the audio signals through a voice recognition algorithm in response to determining that both the audio signals and the head muscle activity signals satisfy their respective criterion indicative of the user speaking, and not perform voice recognition processing of audio signals while either audio signals or head muscle activity signals do not (Continued)

satisfy their respective criterion indicative of the user speaking.

20 Claims, 7 Drawing Sheets

(51) Int. Cl.
*G10L 17/00* (2013.01)
*G10L 15/22* (2006.01)
*G10L 15/24* (2013.01)
*G10L 25/78* (2013.01)

(56) References Cited

U.S. PATENT DOCUMENTS 5,293,452 A * 3/1994 Picone .................. G10L 15/142 704/250
5,638,436 A * 6/1997 Hamilton .............. H04M 1/652 379/282
5,826,234 A * 10/1998 Lyberg ................ G06F 17/2872 704/2
6,493,436 B1 * 12/2002 Fowler .................... H04M 3/12 379/101.01
7,369,991 B2 5/2008 Manabe et al.
7,418,385 B2 8/2008 Manabe et al.
7,480,616 B2 1/2009 Manabe et al.
7,627,470 B2 12/2009 Manabe et al.
2004/0064314 A1 * 4/2004 Aubert .................... G10L 25/87 704/233
2005/0102134 A1 * 5/2005 Manabe .................. G06F 3/015 704/207
2007/0100611 A1 * 5/2007 Ps ....................... G10L 21/0208 704/213
2008/0262381 A1 * 10/2008 Kolen .................. A61B 5/0008 600/549
2010/0004932 A1 * 1/2010 Washio ................... G10L 15/05 704/255
2010/0074451 A1 * 3/2010 Usher .................... H04R 25/70 381/58
2010/0121637 A1 5/2010 Roy et al.
2010/0241433 A1 * 9/2010 Herre .................... G10L 19/022 704/500
2010/0280827 A1 * 11/2010 Mukerjee .............. G10L 15/142 704/236
2011/0010172 A1 * 1/2011 Konchitsky ............. G10L 15/24 704/233
2011/0246187 A1 10/2011 Srinivasan et al.
2012/0130154 A1 * 5/2012 Sajan ...................... G10L 21/06 600/23
2012/0284022 A1 * 11/2012 Konchitsky ............ G10L 25/78 704/231
2013/0021459 A1 * 1/2013 Vasilieff .................. G10L 25/78 348/77
2013/0054236 A1 * 2/2013 Garcia Martinez ..... G10L 25/78 704/233
2013/0103398 A1 * 4/2013 Rauhala ................. H04R 29/00 704/233
2013/0151248 A1 * 6/2013 Baker, IV ............... G10L 25/51 704/228
2013/0197911 A1 * 8/2013 Wei ......................... G10L 25/87 704/235

FOREIGN PATENT DOCUMENTS

EP 1517298 A1 3/2005
JP 4381404 B2 12/2009

OTHER PUBLICATIONS

Maier-Hein L., et al., "Session Independent Non-Audible Speech Recognition Using Surface Electromyography," IEEE Workshop on Automatic Speech Recognition and Understanding, 2005, pp. 331-336.

Scheme E.J., "Myoelectric Signal Classification for Phoneme Based Speech Recognition," 2005, 85 pages.

Sharma R., et al., "Feature evaluation for recognition of unspoken small vocabulary using facial EMG," International Journal of Biomechatronics and Biomedical Robotics, 2012, vol. 2 (1), pp. 32.

3gpp: "3GPP TS 26.094 version 11.0.0 Release 11 Adaptive Multi-Rate (AMR) speech codec; Voice Activity Detector (VAD)", Sep. 21, 2012 (Sep. 21, 2012), pp. 1-27, XP055169154, Retrieved from the Internet: URL:http://www.etsi.org/deliver/etsi_ts/126000_126099/126094/11.00.00_60/ts_126094v110000p.pdf [retrieved on Feb. 11, 2015].

International Search Report and Written Opinion—PCT/US2014/069110—ISA/EPO-Mar. 6, 2015.

* cited by examiner

CONTROLLING A SPEECH RECOGNITION PROCESS OF A COMPUTING DEVICE

BACKGROUND

Research shows that the number of wearable computing devices available for consumers will increase fivefold over the next four years. The user input for wearable computing devices will be a key determining factor as to the success of certain wearable computing devices. One such user input method for a wearable computing device includes voice recognition. Voice recognition algorithms decipher a user's speech to determine the command intended by the user.

SUMMARY

Methods and devices of the various embodiments enable a computing device receiving audio signals from a microphone and head muscle activity signals from a muscle movement detector to activate a speech recognition process only when a user is speaking in order to conserve power and processing resources when the user is not speaking. Embodiment methods and devices may include receiving audio signals from a microphone, receiving muscle activity signals from a muscle movement detector configured and positioned to measure head muscle activity of a user of the computing device contemporaneously with receiving audio signals from the microphone, determining whether the audio signals satisfy an audio characteristic criterion indicative of the user of the computing device speaking, determining whether the head muscle activity signals satisfy a muscle movement criterion indicative of the user of the computing device speaking. Embodiment methods and devices may also include processing the audio signal through a voice recognition algorithm in response to determining both that the audio signals satisfy an audio characteristic criterion indicative of the user of the computing device speaking and that the head muscle activity signals satisfy a muscle movement criterion indicative of the user of the computing device speaking, and not processing the audio signal through the voice recognition algorithm while either the audio signals do not satisfy an audio characteristic criterion indicative of the user of the computing device speaking or the head muscle activity signals do not satisfy a muscle movement criterion indicative of the user of the computing device speaking.

In some embodiment methods and devices, determining whether the audio signals satisfy an audio characteristic criterion indicative of the user of the computing device speaking may include determining whether a root mean square (RMS) level of the audio signals exceeds an RMS threshold level.

In some embodiment methods and devices, determining whether the audio signals satisfy an audio characteristic criterion indicative of the user of the computing device speaking may include comparing the received audio signals to characteristic tonal patterns of speech, determining whether the received audio signals match the characteristic tonal patterns of speech to a degree that exceeds a tonal-pattern matching threshold, and determining that the audio signals satisfy an audio characteristic criterion indicative of the user of the computing device speaking in response to determining that the received audio signals match characteristic tonal patterns of speech to a degree that exceeds the tonal-pattern matching threshold.

In some embodiment methods and devices, determining whether the head muscle activity signals satisfy a muscle movement criterion indicative of the user of the computing device speaking may include determining whether the received head muscle activity signals exceeds a muscle movement signal magnitude threshold indicative of speech.

In some embodiment methods and devices, determining whether the head muscle activity signals satisfy a muscle movement criterion indicative of the user of the computing device speaking may include comparing the received head muscle activity signals to muscle movement signal patterns indicative of the user of the computing device speaking, determining whether the received head muscle activity signals match the characteristic head muscle activity signal patterns indicative of the user of the computing device speaking to a degree that exceeds a muscle activity pattern matching threshold; and determining that the received head muscle activity signals satisfy a muscle movement criterion indicative of the user of the computing device speaking in response to determining that the received head muscle activity signals match the characteristic head muscle activity signal patterns indicative of the user of the computing device speaking to a degree that exceeds the muscle activity-pattern matching threshold. The muscle movement signal patterns of the various embodiment methods and devices may include head muscle activity signals learned from training by the user and stored in memory of the computing device.

BRIEF DESCRIPTION OF THE DRAWINGS

The accompanying drawings are presented to aid in the description of embodiments of the disclosure and are provided solely for illustration of the embodiments and not limitation thereof.

DETAILED DESCRIPTION

Figure 1:
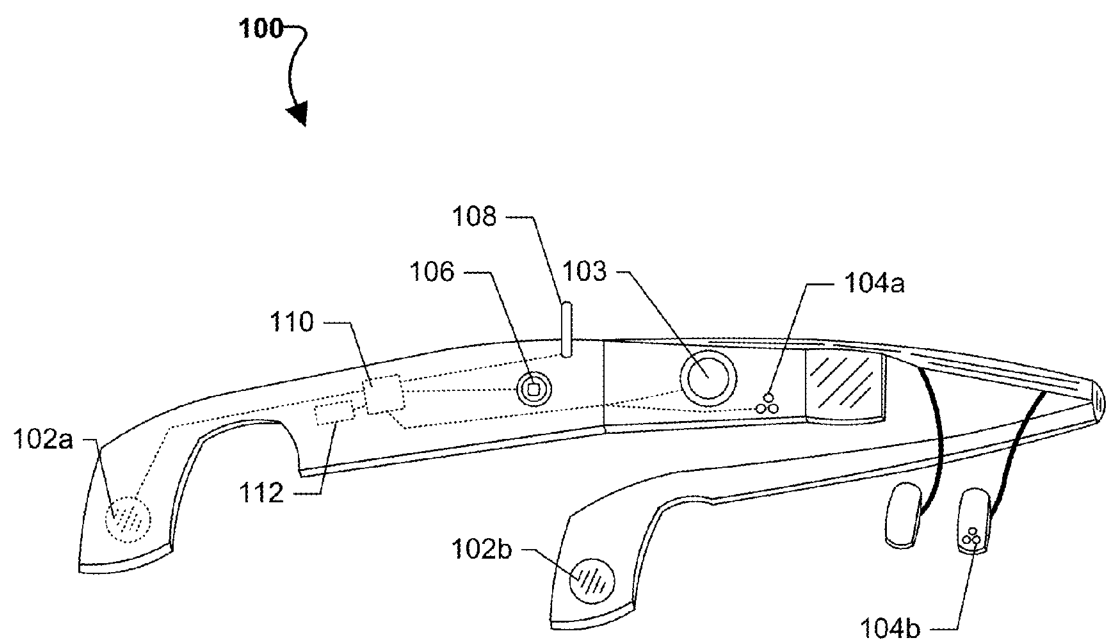
FIG. 1 is a perspective view of a wearable computing device suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the disclosure or the claims. Alternate embodiments may be devised without departing from the scope of the disclosure. Additionally, well-known elements of the disclosure will not be described in detail or will be omitted so as not to obscure the relevant details of the disclosure.

The word "exemplary" is used herein to mean "serving as an example, instance, or illustration." Any implementation described herein as "exemplary" is not necessarily to be construed as preferred or advantageous over other implementations. Additionally, the words "first" and "second" or similar verbiage are used for clarity purposes to distinguish various described elements and are not intended to limit the claims to a particular order or hierarchy of elements.

Voice recognition is a computationally intense process that can consume large amounts of power. Running voice recognition processing routines on audio inputs when the user is not talking (e.g., music in the surrounding environment) wastes energy which in a battery powered device may limit the time that the device can operate before it must be recharged. Thus, constantly processing voice recognition routines on all received audio inputs, including background noise, may negatively impact a user's experience with a wearable computing device.

The various embodiments relate to saving power in a wearable computing device in which the processing of the audio signals and/or head muscle activity signals (e.g., EMG signals) through a voice recognition algorithm is only performed when the received audio signals satisfy an audio characteristic criterion and the received head muscle activity signals satisfy a muscle movement criterion indicative of the user speaking. The various embodiments minimize needless voice recognition processing operations, and thus conserve the limited battery power of a wearable computing device (e.g., smart glasses).

In the various embodiments, a computing device may use one or more head muscle movement detectors, such as an electromyography (EMG) sensor, to detect muscle movements when the user speaking (e.g., signal strengths do not exceed a threshold level). Also, one or more microphones may receive audio signals when the user is speaking (e.g., received audio has RMS levels below a threshold). Based on determinations made from both the audio signals received from the microphone and the head muscle activity signals received from the muscle movement detectors, the computing device may determine whether to activate a voice recognition algorithm. In this way, a processor, such as a digital signal processor (DSP), only processes the audio signals and/or muscle activity signals using the computationally demanding speech recognition algorithms when it is likely that the user is speaking. Unless thresholds are met from both the received audio signals and the received muscle activity signals, the computing device may deactivate a voice recognition algorithm to refrain from processing received audio signals and/or received muscle activity signals.

The terms "wearable computing device" or "smart glasses" are used interchangeably herein to refer to a computing device with a processor configured for processing received audio signals through a voice recognition algorithm. The wearable computing device may have one or more other components such as a microphone, muscle movement sensor, an input mechanism, a transceiver, a display, and a camera. Although a wearable computing device implies that the device is wearable, such as smart glasses or a smart watch, any computing device able to accept audio signals with wired or wireless muscle movement detectors is envisioned for the various embodiment methods. For example, a mobile phone with remote muscle movement sensors could be used in the embodiments of the described methods.

As used herein, the term "microphone" refers to an input transducer of a computing device that picks up sound (one or more input audio signals) from the immediately surrounding environment and converts it into an electrical signal.

As used herein, the term "head muscle activity" or "muscle activity" refers to activity of any head muscle (including facial muscles) involved in human speech. One head muscle involved in human speech is the temporal muscle or the temporalis, which when it contracts causes movement of the jaw (e.g., it contracts when the lower jaw is raised). Another muscle involved in human speech is the masseter muscle, which also helps raise the lower jaw. In the various embodiments, head muscle activity detectors may be positioned to detect movement of either of the temporalis or the masseter muscles, as well as other head, facial and neck muscles involved in human speech.

As used herein, the term "head muscle movement detector" or "muscle movement detector" refers to a sensor capable of detecting head muscle activity, particularly those muscle movements (e.g., temporal muscle movements) associated with the speaking user or wearer of the computing device. A muscle movement detector may be able to receive a head muscle movement activity, which is a representation of the movement of head muscles and/or the surface skin associated with the movements of the head. In the various embodiments, the muscle movement detector may be particularly suited and/or situated to detect muscle movement associated with speaking. An exemplary muscle movement detector in accordance with an embodiment is an electromyography (EMG) sensor. EMG is a technique for evaluating and recording the electrical activity produced by skeletal muscles.

An EMG sensor may detect signals in the form of the electrical potentials generated by muscle cells when these cells are electrically or neurologically activated. The signals may be analyzed to detect biomechanics of humans, such as jaw movements corresponding to a person speaking. An EMG sensor may measure muscle movement activity by detecting and amplifying the tiny electrical impulses that are generated by muscle fibers when they contract.

Another form of muscle movement detectors may include one or more conductive textile electrodes placed in contact with the skin, which may detect changes caused by muscle motion, tissue displacement and/or electrode deformation. A further muscle movement detector may be a pressure sensor configured to detect skin surface changes, particularly at or near the wearer's jaw. Another muscle movement detector may be a microphone configured to detect sound conducted through the wearer's tissue, including bones.

FIG. 1 illustrates a perspective view of a wearable computing device 100 in the form of smart glasses suitable for implementing the embodiment methods. Although smart glasses are shown, any mobile computing device may implement the embodiment methods. However, for sake of clarity and brevity and without limitation, the embodiments will be described with reference to a wearable computing device, such as the smart glasses illustrates in FIG. 1.

A wearable computing device 100 may have one or more microphones 104*a*, 104*b* for receiving and converting sound into audio signals. The microphone 104 receives sound in the surrounding environment including sound from the user's voice and sound not from the user's voice, such as music playing in the background or loud conversations. The wearable computing device may include a microphone 104*b* positioned and configured for receiving audio directly from the user while a different microphone 104*a* may be positioned and configured for receiving audio from the surrounding environment (i.e., not from the user). The wearable computing device of the various embodiments may include a power source, such as one or more batteries.

The wearable computing device 100 may also include one or more head muscle movement detectors 102*a*, 102*b* configured to detect muscle movement and generate head muscle activity signals. The muscle movement detectors may be electromyography (EMG) sensors. More than one muscle movement detector may be used to provide redundancy and/or sense different muscle groups. The muscle movement detector(s) 102*a*, 102*b* may be configured to engage a portion of the wearer's skin at a location suitable for detecting head muscle movements, particularly muscle movements associated with speaking. In this way, the muscle movement detector(s) 102*a*, 102*b* may be configured to detect movements of head muscles when the wearer is speaking.

The wearable computing device 100 may include one or more input mechanisms 106 (e.g., buttons). Input mechanisms may allow the user to override processing of the audio signals and/or the muscle movement signals to directly activate speech recognition processing while the user is pressing the input mechanism. In this way, the user may enable the device to learn the user's audio and/or head muscle activity while speaking, particularly when the user is directing speech to the wearable computing device intended as a command for voice processing.

Input mechanisms may allow the user to correct a decision making process or modify an audio or muscle movement criterion indicative of speech. For example, a user may speak to the wearable computing device 100 without the speech being processed by the voice recognition algorithm (e.g., an audio characteristic criterion or a muscle movement criterion was not satisfied). Immediately following the unregistered speech, the user may engage the input mechanism (e.g., press a button) signaling to a processor that the decision to not process the audio input or muscle activity input was incorrect. A processor of the wearable computing device may update/modify either the audio characteristic criterion or the muscle movement criterion or both to account for and correct the error in not processing the audio from the user's speech.

The wearable computing device 100 may include a wireless transceiver 108. The wireless transceiver 108 may be capable of transmitting and receiving wireless signals from/to a wireless communication network, such as a wireless wide area network (WWAN) (e.g., LTE or any cellular connection) and wireless local area network (WLAN) (e.g., WiFi). The wearable computing device may connect to a network server to transmit and/or receive voice recognition data (e.g., RMS levels, tonal patterns, EMG signal strengths, and EMG signal patterns indicative of speech). The voice recognition data may be received periodically or retrieved based on a command by the user to update processing of received audio signals and head muscle activity signals.

The wearable computing device 100 may further include one or more processors, cores, or co-processors 110 configured with processor-executable instructions to perform operations of the various embodiments. The processor(s) may be coupled to the one or more microphone(s) 104*a*, 104*b* to receive audio signals and the muscle movement detector(s) 102*a*, 102*b* to receive muscle movement signals in order to determine whether to activate or deactivate processing of the audio signals and/or the muscle movement signals through a voice recognition algorithm. The processor(s) 110 may also be coupled to the input mechanism 106, the transceiver 108, and a camera 103.

The processor(s) 110 may be coupled to a memory 112 on which may be stored characteristic patterns of audio and/or muscle movement activity signals indicative of speech. Such stored patterns may be compared by the processor(s) 110 to received signals as described below in order to better distinguish when the user is speaking.

Figure 2:
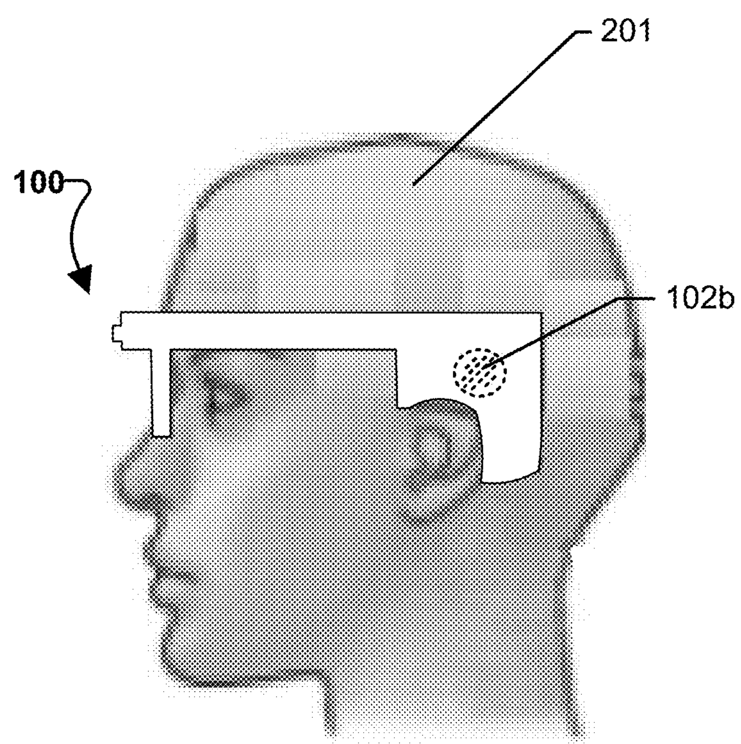
FIG. 2 is an illustration of a user wearing the computing device of FIG. 1.

FIG. 2 illustrates a user 201 wearing the wearable computing device 100 illustrated in FIG. 1. As illustrated one possible location for the muscle movement detector is directly above the ear of the user 201 to detect muscle movement of the temporalis muscle. Although the muscle movement detector is shown as directly connected to the smart glasses, the muscle movement detector may be a separate device placed on anywhere on the user's head or face to detect muscle movement from any muscle that is flexed during speech and wirelessly connect to the smart glasses or other computing device.

Figure 3:
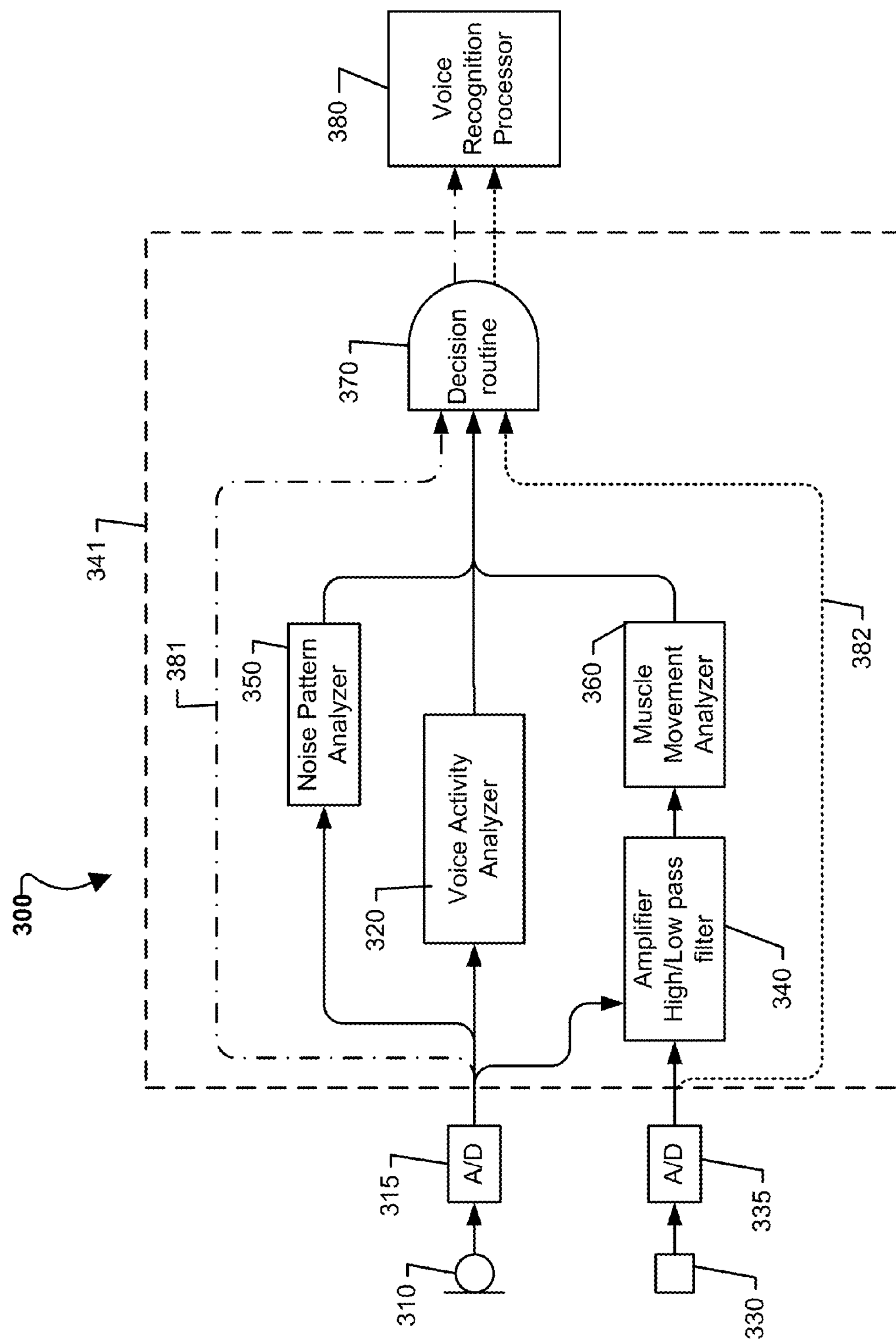
FIG. 3 is a schematic functional block diagram of a wearable computing device suitable for use with the various embodiments.

FIG. 3 illustrates an embodiment schematic functional block diagram of the electronic components of a wearable computing device 300. As discussed above, the wearable computing device includes a microphone 310 (that may include one or more microphones 104*a*, 104*b* illustrated in FIG. 1) for receiving input audio signals. For example, microphone 310 may include a first microphone 104*b* that may be positioned on the wearable computing device (such as close to the user's mouth) to more readily pick up sounds from the wearer's own mouth, while a second microphone 104*a* may be positioned on the device (such as far from the user's mouth) so that it primarily picks up ambient sounds. Regardless of whether there is one or more microphones represented by the microphone 310, microphone 310 receives sound, which may be processed through an analog/digital (A/D) converter 315 to generate digital signals of detected/received sounds. The received audio signals may be processed through the voice activity analyzer 320.

The voice activity analyzer 320 may be a unit that detects whether a voice is present in a received audio signal. In an embodiment, the voice activity analyzer may compare measured root mean square (RMS) levels of audio signals with RMS levels stored in memory that are indicative of speech. The RMS levels indicative of speech may be previously stored on the device (i.e., generic RMS levels associated with human speech) and may be learned over time to reflect the speech patterns of the individual using the computing device. RMS levels indicative of a user speaking may be in the form of a particular decibel limit. For example, a user may speak commands to their wearable computing device at a softer level than talking to a person across a dinner table, thus it may be unlikely that a user would yell (e.g., high decibel level) at their wearable computing device to indicate a voice command. The voice activity analyzer may detect a user is speaking or directing speech to the wearable computing device by comparing measured RMS values of the received audio signals to a RMS threshold level. If the received audio signal has an RMS level above the threshold level, the voice activity detection may determine that the user is not speaking to the computing device.

In an embodiment, the voice activity analyzer 320 may be configured to specifically detect the wearer's voice by applying frequency analysis to received audio signals in order to recognize one or more fundamental frequencies characterizing the user's speech patterns. Thus, the voice activity analyzer 320 may act as a voice detector by comparing the digitized representation of received sounds to one or more sets of frequency patterns or tonal patterns correlated to human speech, such as a tonal patterns learned by the device by listening to the user over a period of time. For example, as part of the setup of the voice activity analyzer 320 and the wearable computing device, the user may be asked to train the device by reading aloud a paragraph or repeating some phrases, and the computing device may use this input to identify frequency patterns, tonal patterns, and/or RMS levels of the user's speech that can be stored in a memory for later use in analyzing acoustic signals to recognize voice commands by the user. Alternatively, the presence of synchronous patterns and harmonic structures of the sounds associated with one or more designated languages, words and/or even syllables may be used to identify voice activity. In this way, the voice activity analyzer 320 may determine whether at least a portion of the received audio signals, such as characteristics represented by an audio signal pattern, is a match to similar characteristics of a first tonal pattern associated with speech generated by the wearer. A match of audio signals with a tonal pattern means the two patterns (each representing an audio signal) are substantially similar. Additionally, the voice activity analyzer 320 or noise pattern analyzer 350 may serve as a filter, identifying predefined sounds, undesirable noises and/or patterns (collectively referred to as "noise") for which the computing device need not apply voice recognition processing. The portion of the received audio signal identified to be noise may be ignored or labeled as a noise pattern that may be subtracted from the received audio signal at the decision routine 370 if the wearable computing device determines that the user is speaking. In this way, those portions identified as "noise" may be stored for recording purposes (such as capturing an audio recording of one's environment) by the wearable computing device, but not necessarily amplified or attenuated. Those portions of the input audio signal including human speech may be forwarded to the decision routine 370, along with any indication as to whether any sub-portion thereof has been identified as human speech and/or the wearer's speech. Those portions of the audio signals identified to be "noise" may be attenuated by the decision routine 370 or filtered out entirely by the noise pattern analyzer 350 and/or the voice activity analyzer 320.

The wearable computing device muscle movement detector 330 positioned for receiving head muscle activity signals, particularly from head muscles associated with speech, may be an EMG sensor that may include surface electrodes for measuring a voltage differential. A muscle movement detector 330 may be located so that it makes direct contact with the wearer's skin when the device is worn. For example, the muscle movement detector 330 may be positioned on an external portion of the wearable computing device 100 in contact with head or facial regions of the user/wearer (e.g., behind a user's ear as shown in FIG. 2) whose movement is associated with speaking.

The muscle movement detector 330 may include more than one muscle movement detector in order to detect/differentiate patterns of muscle movement and/or to provide redundancies to ensure movement is detected. For example, a first muscle movement detector may be disposed on a first part of the wearable computing device, while a second muscle movement detector may be disposed remote from the first muscle movement detector on a second part of the wearable computing device 100 or even remote from the main wearable computing device body.

The muscle movement detector 330 generates signals that characterize head muscle activity, which may be processed through an analog/digital (A/D) converter 335 for digital processing by the device processor. The received head muscle activity may be processed as one or more signals through an amplifier filter 340.

The amplifier filter 340 may process head muscle activity signals of the user at the same time the voice activity analyzer 320 is processing audio from the microphone of the wearable computing device. The amplifier filter may send a high amplify signal to the muscle movement analyzer 360 when it recognizes a muscle movement signal that corresponds to movements of the user speaking. Similarly, the amplifier filter 340 may send a low amplify signal to the muscle movement analyzer 360 when the amplifier filter 340 determines that muscle movement signals do not correspond to the user's speech. These high or low amplify signals may help the decision routine 370 determine the time periods within the received audio signal that most likely correspond to the user speaking so that a processor of wearable computing device may decide whether to activate the voice recognition processor 380 on at least the received audio signals if not both the audio signals and the muscle movement signals.

The muscle movement analyzer 360 may receive audio signals from the amplifier filter 340 in addition to the original muscle movement signals (e.g., original EMG signals). The muscle movement analyzer 360 may process the muscle movement signals to distinguish "noise" within the received EMG signals. For example, the muscle movement detector 330 may generate muscle movement signals (e.g., EMG signals) when the user moves his mouth (or jaw) just prior to speaking and just after speaking. The muscle movement analyzer 360 may correlate the received muscle movements of the user with particular audio segments such that muscle movement signals without a contemporaneous or concurrent audio segment are deemed "noise" and may be distinguished from muscle movement signals with a contemporaneous or concurrent audio segment. For example, the muscle movement detector 330 may generate muscle movement signals when a user chewing gum but the microphone 310 may not receive audio signals since the user is not speaking, thus the muscle movement analyzer 360 may determine that the muscle movement signals are "noise" since it has not received a contemporaneous audio signal. The muscle movement analyzer 360 may send the processed muscle movement signals to the decision routine 370.

In an embodiment, as part of the setup of the muscle movement analyzer 360 and the wearable computing device 100, the user may be asked to train the device by reading aloud a paragraph or repeating some phrases while the computing device analyzes the muscle movement signal strengths and/or muscle movement patterns of the user's speech. Detected muscle movement signal patterns may be stored in a memory for later use in analyzing acoustic signals and/or head muscle activity signals to recognize voice commands by the user. Alternatively, the presence of synchronous muscle movement patterns associated with one or more designated languages, words and/or even syllables may be used to identify voice activity. Thus, the muscle movement analyzer 360 may learn muscle movement signal strengths and/or muscle movement patterns that are unique to the user.

In decision routine 370, a processor of the computing device may determine whether a segment of both the head muscle activity signals and the audio signals correspond to the user speaking. If the wearable computing device determines that both the head muscle activity signals and the audio signals correspond to the user speaking, the audio signals may be sent to a voice recognition processor for voice recognition processing through a voice recognition algorithm. In an embodiment, the head muscle activity muscle movement signals may be sent along with the audio signals to the voice recognition processor 380 when voice recognition processing is activated. In an embodiment, when the processor executing the decision routine 370 determines from the combination of the head muscle activity signals and the audio signals that the user is speaking, only those snippets of audio data corresponding to when the user is speaking, as may be indicated by the head muscle activity signals, may be sent to the voice recognition processor 380 for processing. In this manner, the muscle movement signals may be used to gate the audio data 381 (and optionally head muscle activity data 382) that is processed for voice recognition, reducing the amount of sound data (and optionally muscle activity data) that is processed by the voice recognition algorithms, which may save battery power, and free up processing resources for other tasks, and reduce errors by excluding background noise, voices of others nearby, and muscle movement signals not attributable to the user speaking.

In an embodiment, a processor at decision routine 370 may learn RMS levels and/or muscle movement signal strengths patterns uniquely identifiable to the user. For example, each user may have a different average RMS level and/or muscle movement signal strengths than another user. One user who is hard of hearing may speak more loudly at their wearable computing device and have larger movements of their jaw when speaking than another user who is not hard of hearing. Thus, the decision routine 370 implemented by a processor may adjust or create personalized RMS thresholds and/or muscle movement signal strength thresholds for the user. In an embodiment, each time the computing device processor performing the decision routine 370 determines that the received audio signals and the head muscle activity signals correspond to speech, the processor may store the RMS level and/or the muscle movement signal strength level in memory. In another embodiment, the user may correct a wrong interpretation of the received audio (e.g., the device processor determines that the RMS level does not indicate speech) and/or the received head muscle activity signals by pressing an input mechanism (e.g., input mechanism 106 in FIG. 1) immediately following such an error, to which the processor may react by deleting or adjusting stored audio RMS and/or muscle activity signal thresholds used in erroneously interpreting the received signals as indicative of speech.

In an embodiment, a processor implementing the decision routine 370 may learn tonal patterns and/or muscle movement patterns unique to the user. In an embodiment, each time the processor determines that the received audio signals and the head muscle activity signals correspond to the user's speech, the processor may use the audio signals and head muscle activity signals to refine the audio signal and head muscle activity patterns stored in memory that the processor uses to recognize the user's speech. In this manner, the computing device can learn to recognize the user's voice and thus improve its ability to correctly recognize spoken commands.

It should be noted that operations of the voice activity analyzer 320, noise pattern analyzer 350, amplifier 340, muscle movement analyzer 360, and decision routine 370 may be implemented in a single processor 341 such as a digital signal processor (DSP) or multiple processors. For the sake of clarity and brevity, the embodiment methods are described as being performed by a single processor 341, which gates the voice recognition processor 380 from performing computationally intense voice recognition processes. However, the claims are not intended to be limited to such a hardware implementation unless specifically recited.

Figure 4:
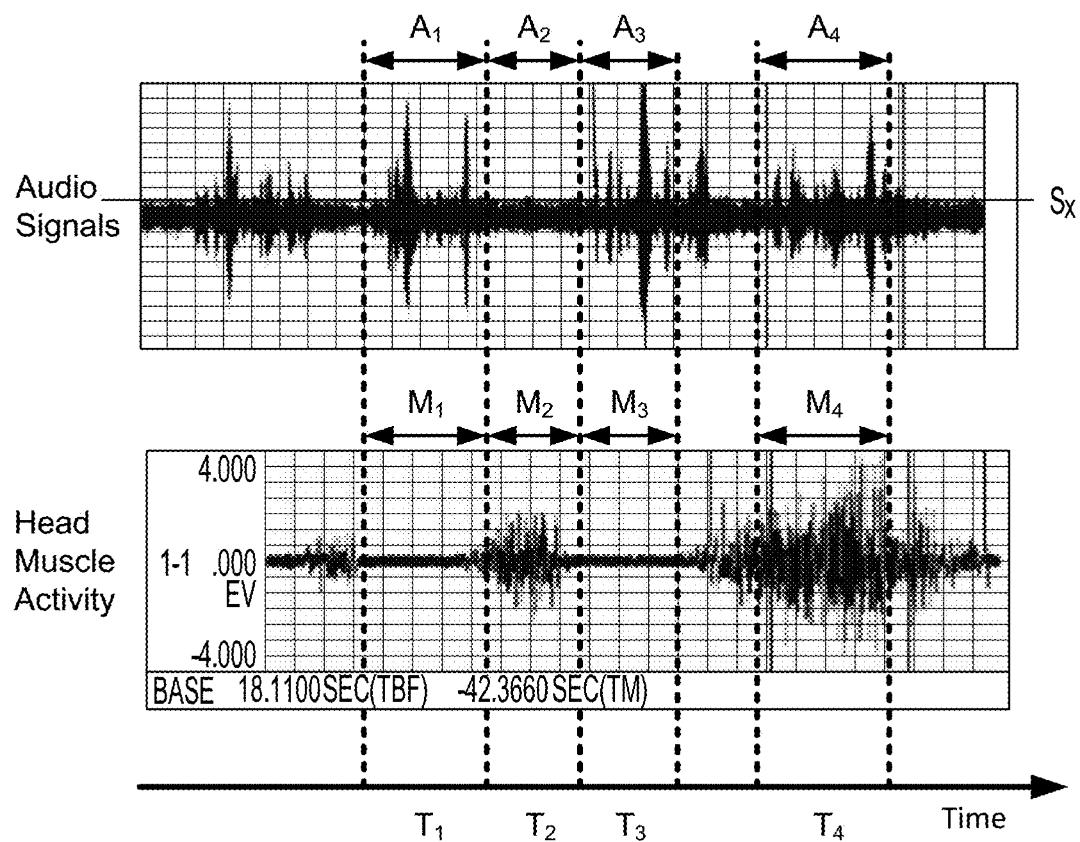
FIG. 4 is a graph of audio and EMG data received from a microphone and an EMG sensor.

FIG. 4 illustrates audio signals received from the microphone 310 and the head muscle activity signals (e.g., EMG signals) received from the muscle movement detector 330 at the same time to illustrate how correlating the two sets of signals may be used to improve the accuracy of detecting the user's speech for purposes of activating voice recognition processing of the audio signals. The upper graph illustrates the analog audio signals detected by the microphone 310. The lower graph illustrates analog head muscle activity detected by the muscle movement detector 330, which in this example is from an EMG sensor. The upper and lower graphs run contemporaneously, meaning they represent separate inputs occurring in the same period of time, thus illustrating how audio and EMG signals may be correlated over time.

When the audio signals and the EMG signals are received contemporaneously, the decision routine 370 implemented by the processor 341 may use both signals to determine when to active voice recognition processing in the voice recognition processor 380 as illustrated in FIG. 3. For example, when either audio signals or the EMG signals consistent with the user speaking are not present, the processor 341 may determine that the wearable computing device user is not speaking and may leave the voice recognition processing or the voice recognition processor 380 deactivated. However, when both sound and muscle movement signals consistent with the user speaking are detected, the processor 341 may determine that the user is speaking and activate the voice recognition processing and/or voice recognition processor. This process is illustrated in the four time periods $T_1$-$T_4$ illustrated in FIG. 4 and described below.

In a first example, during a first time period $T_1$ the microphone 310 receives sound and produces an audio signal segment $A_1$. During the same time period, the muscle movement detector 330 does not detect head muscle activity of the user as illustrated by the lack of signal in head muscle activity signal segment $M_1$. This situation may occur when the microphone 310 of the wearable computing device receives sound from the surrounding environment that does not originate from the user (e.g., voice from a person near the user wearing the wearable computing device). Thus, the microphone 310 picks up the voice from the other person, but not head muscle activity from the EMG sensor corresponding to the user talking because the user is not talking. With this information, the processor 341 may conclude that the sounds received in audio signal segment $A_1$ in time period $T_1$ do not correspond to the user speaking, and instructs the voice recognition processor 380 to deactivate (or remain deactivated), thus avoiding unnecessary processing of sound in audio signal segment $A_1$.

The second example illustrates signals that may be received when the user is moving head or facial muscles but not speaking during time period $T_2$, such as when the user is eating or chewing gum. In this situation, the muscle movement detector 330 of the wearable computing device detects head muscle activity from the user in head muscle activity signal segment $M_1$ that does not correspond to speech. Thus, the muscle activity detector 330 picks up head muscle activity from the user, but just background sound from the microphone 310 because the user is not talking and there is no sound in the vicinity of the microphone 310. With this information, the processor 341 executing decision routine 370 may conclude that the user is not speaking because there is only a head muscle activity segment $M_2$ without a corresponding audio signal segment $A_2$ at time period $T_2$. In response, the processor 341 may instruct the voice recognition processor 380 to deactivate (or remain deactivated), thus avoiding unnecessary processing of sound in audio signal segment $A_2$.

The third example is similar to the first in that during the third time period $T_3$ the microphone 310 receives loud sound reflected in audio signal segment $A_3$ but the user is not speaking, so the muscle movement detector 330 does not detect any head muscle activity from the user in segment $M_3$. Thus, similar to the first example, the processor 341 executing the decision routine 370 determines that the audio signal segment $A_3$ in time period $T_3$ does not correspond to the user speaking because there is no corresponding head activity signal. In response, the processor 341 may instruct the voice recognition processor 380 to deactivate (or remain deactivated), thus avoiding unnecessary processing of sound in audio signal segment $A_3$.

In a fourth example, during time period $T_4$ the microphone 310 receives sound producing audio signal segment $A_4$ and the muscle movement detector 330 detects head muscle activity and produces head activity signal segment $M_4$. This may occur when the microphone 310 of the wearable computing device receives sound from the user speaking (e.g., giving a command to the wearable computing device) because the EMG sensor 330 may detect head muscle activity of the user's jaw moving to form words. In response to receiving both significant audio signals in audio segment $A_4$ and significant muscle activity in head activity signal segment $M_4$, the processor 341 executing the decision routine 370 may determine that the user is likely speaking and activate voice recognition processing in the voice recognition processor 380.

Figure 5:
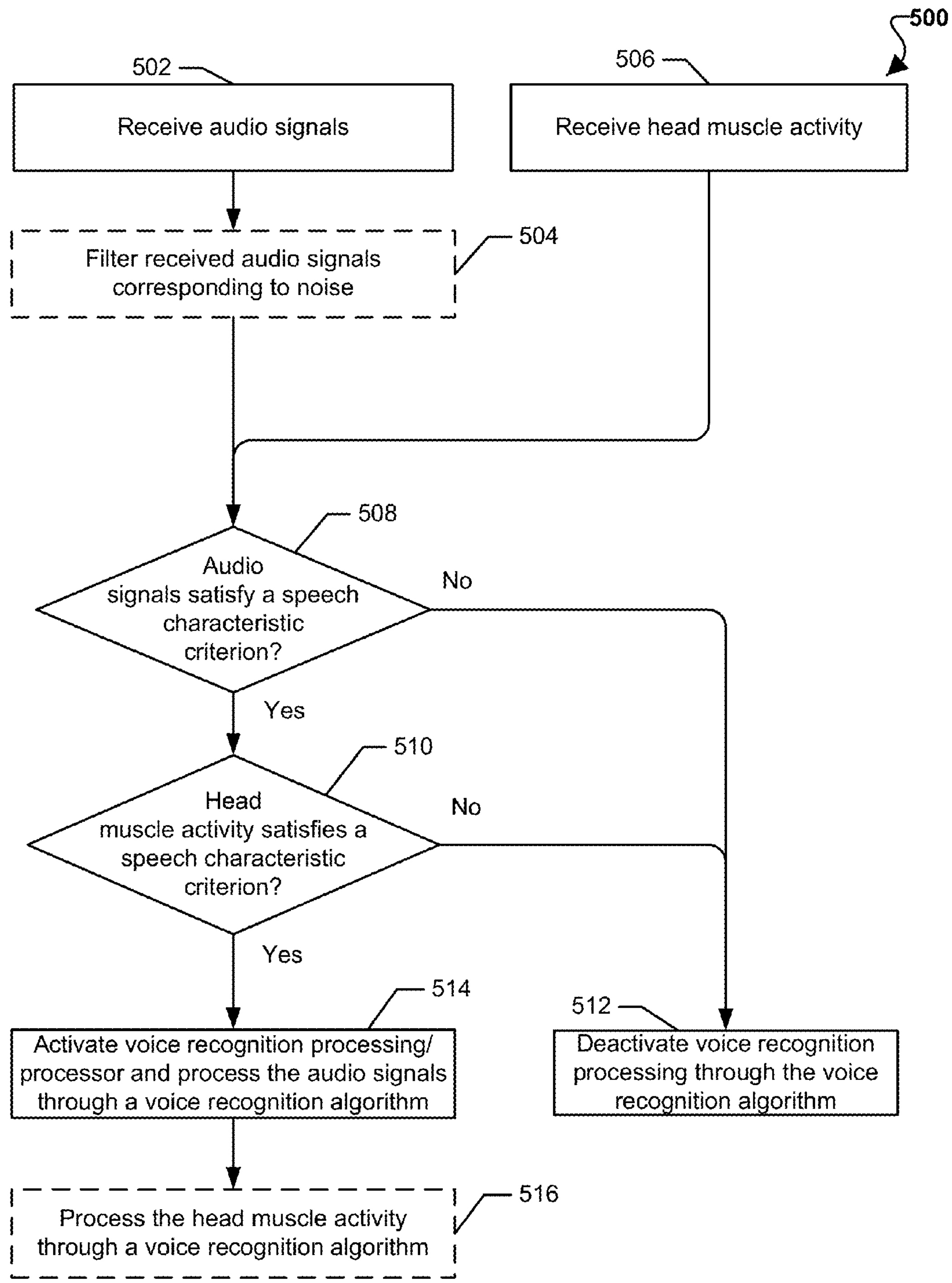
FIG. 5 is a process flow diagram illustrating an embodiment method for determining whether to process audio signals for voice recognition.

FIG. 5 illustrates a process flow diagram illustrating an embodiment method for controlling a speech recognition process of a computing device, such as a wearable computing device, based on signals from both a microphone and a head muscle activity sensor. The embodiment method 500 may be implemented on one or more processors of a wearable computing device. For the sake of conciseness and clarity, method 500 is described as implemented by a single processor that is separate from the voice recognition processor. However, embodiments may be implemented in a variety of processor architectures so the claims are not intended to be limited to such an embodiment unless specifically recited.

In block 502, a processor of the wearable computing device receives audio signals from one or more microphones, such as microphones 104*a*, 104*b*, 330 illustrated in FIGS. 1 and 3.

In optional block 504, the received audio signals may be amplified or filtered to remove noise and/or easily defined segments that may be ignored. For example, received audio signals that are so distorted as to clearly not be discernible as human speech (either by decibel level or other characteristics) a processor may separate these portions of the audio signal from other portions that have a higher likelihood of being discernible speech.

At the same time, in block 506 the processor receives head muscle activity signals (e.g., EMG signals) from one or more muscle movement detectors, such as EMG sensors 102*a*, 102*b*, 330 illustrated in FIGS. 1 and 3. The received muscle activity or muscle movement signals may be unprocessed signals from the muscle movement detector(s) that may be analyzed by the processor to determine whether they correspond to muscle movement patterns associated with a user speaking.

In determination block 508, the processor may determine whether the received audio signals satisfy an audio characteristic criterion associated with the user speaking. In this operation, certain characteristics of the audio signals may be compared to thresholds or patterns to determine whether they satisfy a speech characteristic criterion. For example, the RMS value, which may be a measurement of volume, may be compared against a threshold RMS value consistent with the user speaking. As another example, the audio signals may be compared to stored tonal and temporal patterns consistent with speech, such as patterns of the user's speech learned through a training routine and stored in memory. If the processor determines that the audio signals do not satisfy an audio characteristic criterion (i.e., determination block 508="No"), indicating that it is unlikely that the audio could be from the user's voice, the processor may deactivate (or leave deactivated) voice recognition processing and/or a voice analysis processor in block 512. Thereafter, the operations of method 500 may be repeated by the processor in a continuous manner as sounds are picked up by the microphones and head muscle movement activity is detected by the muscle movement detectors.

If the processor determines that the audio signals do satisfy a speech characteristic criterion (i.e., determination block 508="Yes"), indicating that it is possible that the user is speaking based on various factors such as RMS volume level and/or tonal patterns, the processor may determine whether the received head muscle activity signals satisfy a speech muscle movement characteristic criterion in determination block 510. Similar to the analysis of audio signals in determination block 508, the processor may compare received head muscle activity signals to an RMS signal level and/or signal pattern data that is known to be consistent with the user speaking. As an example, the received head muscle activity signals may be compared to signals that were stored in memory during a training process in which the user read a defined script while muscle movement activity signals were recorded. If the processor determines that that audio signals do not satisfy a muscle movement criterion (i.e., determination block 510="No"), indicating that it is unlikely that the user is speaking, the processor may deactivate (or leave deactivated) voice recognition processing and/or a voice analysis processor in block 512. Thereafter, the operations of method 500 may be repeated by the processor in a continuous manner as sounds are picked up by the microphones and head muscle movement activity is detected by the muscle movement detectors.

If the processor determines that the head muscle activity signals do satisfy a speech muscle movement characteristic criterion (i.e., determination block 510="Yes"), the processor may conclude that the user is very likely speaking, and activate voice recognition processing of the audio signals through a voice recognition algorithm in block 514. In optional block 516, the voice recognition algorithm may also use the head muscle activity signals received from the muscle movement detectors as part of the speech recognition analyses in order to increase the accuracy of the voice recognition process.

Thus, as illustrated in method 500, both the audio signals and the head muscle activity signals must satisfy speech characteristic criteria before the processor activates or enables speech recognition processing of the audio signals.

Figure 6:
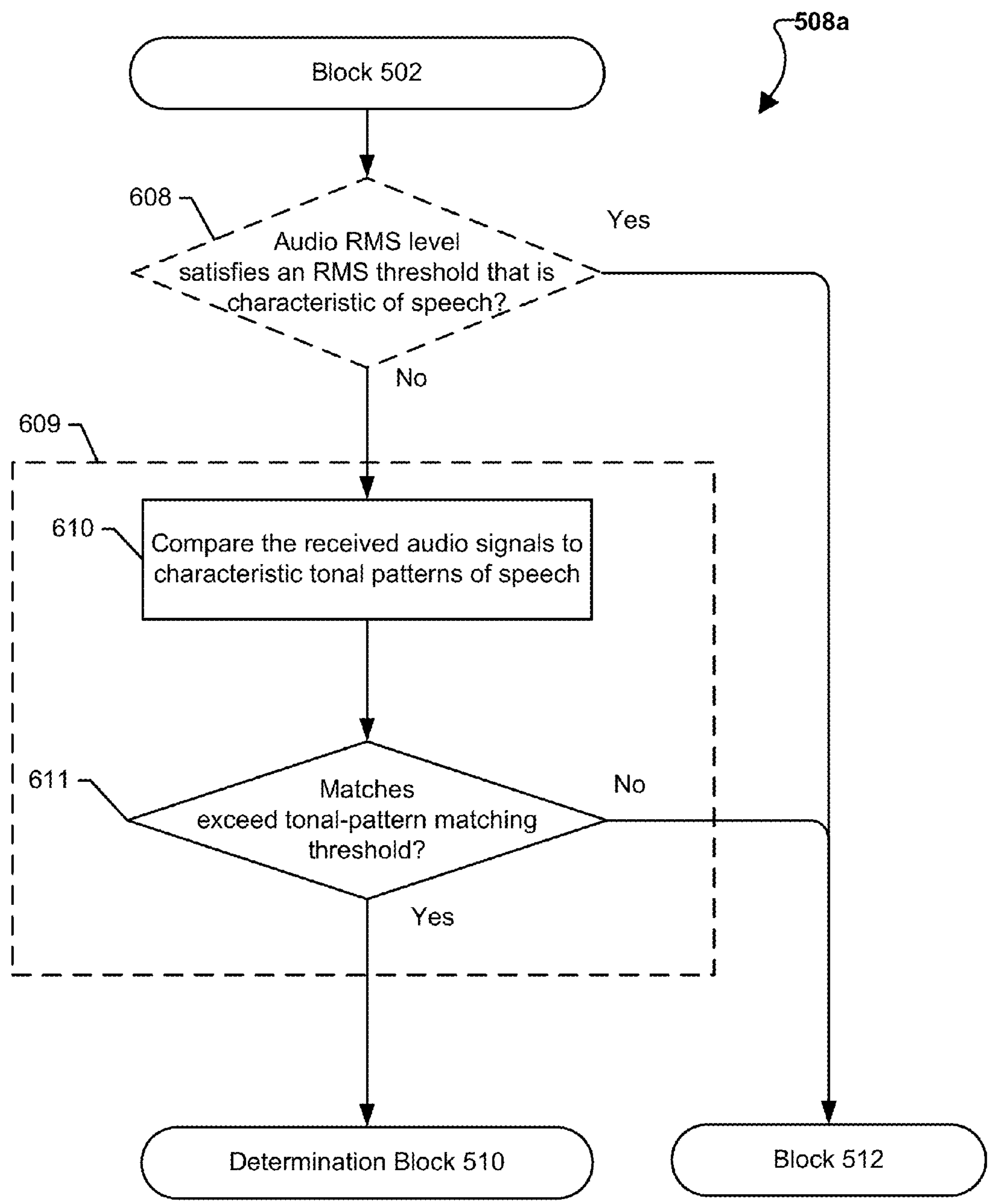
FIG. 6 is a process flow diagram illustrating an embodiment method for determining whether received audio signals satisfy an audio characteristic criterion.

FIG. 6 illustrates an embodiment method 508*a* that may be implemented on a computing device such as a wearable computing device 100 for performing the operations of determination block 508 of method 500 described above with reference to FIG. 5.

In method 508*a*, the processor may optionally determine whether the RMS level of the received audio signals satisfies an RMS threshold level consistent with the user speaking in optional determination block 608. If the processor of the wearable computing device determines that the RMS levels of the received audio signals do not satisfy the RMS threshold level (i.e., determination block 608="Yes"), the processor may deactivate (or leave deactivated) voice recognition processing of the audio signals through a voice recognition algorithm in block 512 of method 500 as described above. For example, if the processor determines that the received audio signals have a higher decibel level than user speech used for giving audio commands to the wearable computing device, the processor may conclude that the user is not speaking (i.e., the sounds are from the environment) or the user is not speaking in a manner intended to be recognized as a voice command. In that case, the processor stops or does not initiate voice recognition processing of the audio signals.

If the processor determines that the RMS level of the received audio signals do satisfy an RMS threshold level that is characteristic of speech (i.e., determination block 608="No"), the processor may perform a pair of optional operations to determine whether the audio signals match tonal patterns characteristic of the user speaking in optional block 609. In block 610, the processor may compare the received audio signals to characteristic tonal patterns of speech stored in memory. In an embodiment, the processor may compare the received audio signals to previously stored tonal patterns (including particular dialects or regional accents) associated with generic human speech. These previously stored patterns may be updated from time to time (automatically or manually) by connecting the computing device to the Internet. In another embodiment, the processor may compare the received audio signals to tonal patterns from a remote server through the Internet using WWAN or WLAN. In a further embodiment, the processor may compare the received audio signals to stored tonal patterns of the user that were obtained during a user training session and store in the memory of the device or a remote server. Alternatively, the user's tonal patterns may be learned over time from listening to the user speaking, with the patterns consolidated into a unique user speaking pattern that can be stored in memory on the device and compared to audio signals to recognize when the user is speaking.

In determination block 611, the processor may determine whether received audio signals match characteristic tonal patterns of speech to a degree that exceeds a tonal-pattern matching threshold. In other words, the received audio signals need not be a perfect match of the characteristic tonal patterns of speech to indicate to the processor that the user is speaking provided the signals match the pattern to a significant degree, such as within a predefined percentage of matches of pattern features. For example, the processor may determine whether the received audio signals match the characteristic tonal patterns within a certain percentage of pattern features (e.g., an 86% match). If the processor determines that the degree to which the received audio signals match characteristic tonal patterns of speech does not meet or exceed a tonal-pattern matching threshold (i.e., determination block 611="No"), the processor may deactivate (or leave deactivated) voice recognition processing of the audio signals through a voice recognition algorithm in block 512 of method 500 as described above. For example, if the processor determines that the received audio signals are only a 45% match to characteristic tonal patterns indicative of speech when the threshold requires at least an 80% match in characteristic tonal patterns, the processor may conclude that the user is not speaking and therefore stop or not activate speech recognition processing of the received audio signals.

If the processor determines that the degree to which the received audio signals match characteristic tonal patterns of speech does meet or exceeds the tonal-pattern matching threshold (i.e., determination block 611="Yes"), the processor may determine whether the received head muscle activity satisfies a muscle movement criterion in determination block 510 of method 500 as described above with reference to FIG. 5. For example, the processor may determine that the received audio signals include the user's speech when the audio signals are a 90% match to the stored tonal patterns indicative of speech when the threshold requires at least an 80% matching characteristic tonal patterns.

In an embodiment, determining whether the audio signals satisfy an audio characteristic criterion in method **508*a* may include the optional operations in determination block 608 but not the optional operations in block 609. In another embodiment, determining whether the audio signals satisfy an audio characteristic criterion in method 508*a* may include the pair of operations in block 609 without performing the operations in optional determination block 608**.

Figure 7:
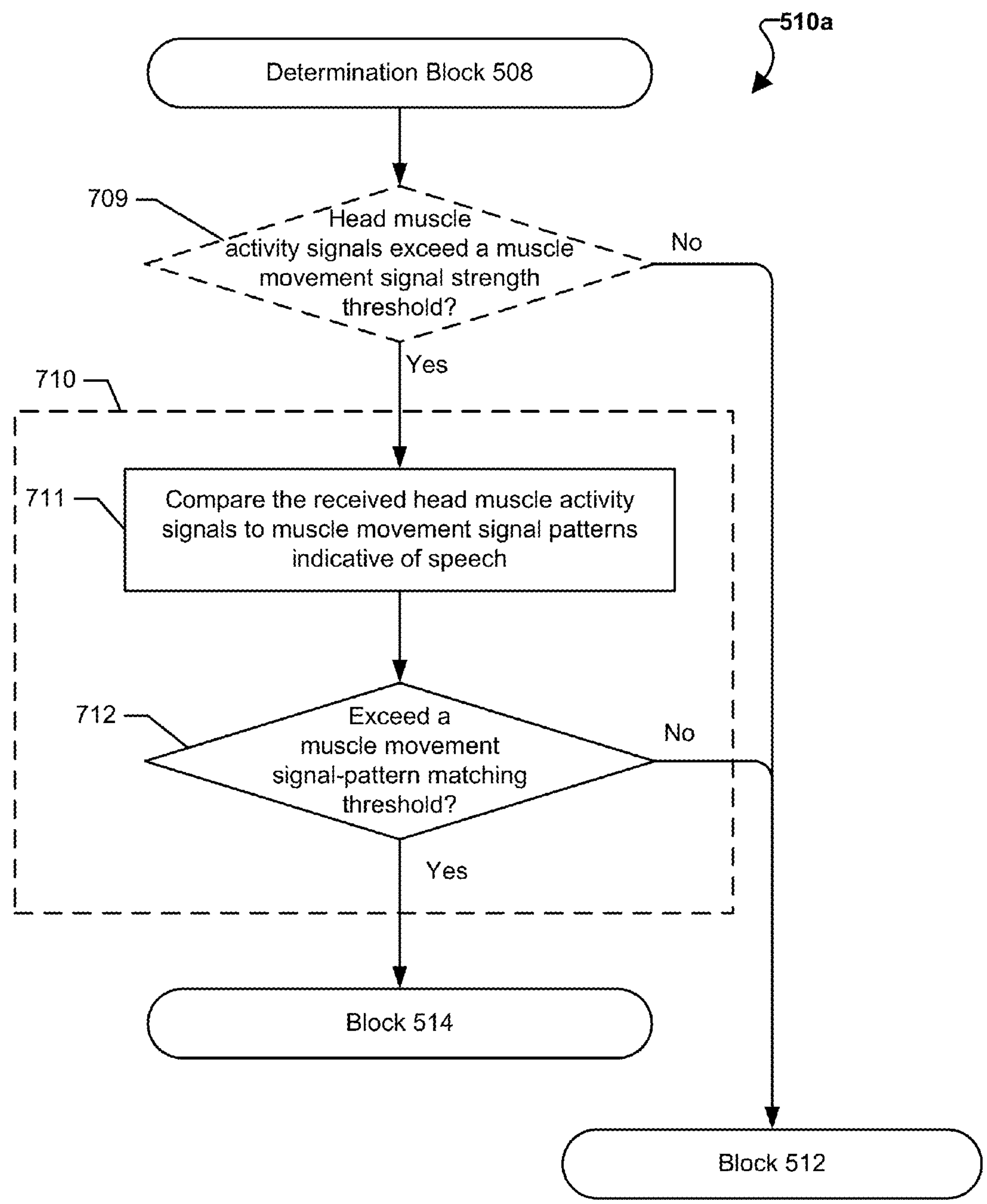
FIG. 7 is a process flow diagram illustrating an embodiment method for determining whether received head muscle activity satisfies a muscle movement criterion.

FIG. 7 illustrates an embodiment method **510*a* that may be implemented on a computing device, such as a wearable computing device 100, for performing the operations of determination block 510 of method 500 described above with reference to FIG. 5. As illustrated in FIG. 7**, this determination may include determining whether the muscle movement activity signals exceed a threshold level (i.e., amplitude or magnitude of activity), match a pattern of activity indicative of indicative of the user speaking, or both exceed a threshold and match a pattern.

After, before or in parallel with determining that the received audio signals satisfy an audio characteristic criterion in determination block 508 of method 500, the processor may optionally determine whether the head muscle activity signals exceed a muscle movement signal-strength threshold in optional determination block 709. If the processor determines that the received head muscle activity signals do not exceed a muscle movement signal strength threshold characteristic of the user speaking (i.e., determination block 709="No"), the processor may deactivate voice recognition processing of the audio signals and/or the head muscle activity signals through a voice recognition algorithm in block 512 of method 500 as described above. For example, if the received head muscle activity signals (e.g., EMG signals) fall below the level of head muscle activity corresponding to when the user speaking, the processor may conclude that the user is not talking even though significant sound is being sensed by the microphone (e.g., determination block 608="Yes").

If the processor determines that the received head muscle activity signals do exceed a muscle movement signal strength threshold characteristic of the user speaking (i.e., determination block 709="No"), the processor may compare the signal to muscle activity signal patterns characteristic of speech to recognize when the user is likely speaking in optional block 710. Such characteristic patterns may be obtained by recording muscle activity signals while the user speaks a defined statement, analyzing the signals to identify characteristic patterns within the signals, and storing the identified characteristic patterns in memory. In this manner, the processor of the computing device can learn patterns to enable it to distinguish signals detected of head muscle activity when the user is speaking from signals detected of head muscle activity when the user is doing other things, such as yawning, eating, exercising or chewing gum.

To distinguish speech muscle movement activity from other head muscle movements, the processor may compare the received head muscle activity signals to stored muscle movement signal characteristic patterns indicative of speech in block 711. This comparison operation may determine a degree to which the received head muscle activity signals match stored muscle movement signal characteristic patterns, such as a percentage match or other metric for how closely received signals correspond to the characteristic patterns. In determination block 712, the processor may determine whether the degree to which the received head muscle activity signals match stored muscle movement signal characteristic patterns exceed a muscle movement signal-pattern matching threshold or otherwise satisfy a matching criterion. If the processor determines that the degree to which the received head muscle activity signals match stored muscle movement signal characteristic patterns do not exceed the muscle movement signal-pattern matching threshold, or do not satisfy another matching criterion (i.e., determination block 712="No"), the processor may deactivate voice recognition processing of the audio signals through a voice recognition algorithm in block 512 of method 500 as described above. For example, if the processor determines that the received head muscle activity signals are only a 45% match to the stored characteristic muscle movement signal-patterns indicative of speech when the threshold requires at least an 80% match to muscle movement signal-patterns, the processor may conclude that the user is not speaking.

If the processor determines that the degree to which the received head muscle activity signals match stored muscle movement signal characteristic patterns does exceed the muscle movement signal-pattern matching threshold, or otherwise satisfies a matching criterion (i.e., determination block 712="Yes"), the processor may activate voice recognition processing of the audio signals through a voice recognition algorithm in block 514 of method 500 as described above. For example, the processor may determine that the received head muscle activity signals are a 94% match to the muscle movement signal-patterns indicative of speech when the threshold requires at least an 80% match to muscle movement signal-patterns, the processor may conclude that the user is speaking.

In an embodiment, determining whether the head muscle activity satisfies a muscle movement criterion in method 510*a* may include the optional determination in optional determination block 709 but not the optional operations in optional block 710. In another embodiment, determining whether the head muscle activity satisfies a muscle movement criterion in method 510*a* may include the optional operations of comparing the head muscle movement activity signals to stored patterns characteristic of speech in optional block 710 but not the determination in optional determination block 709.

As described above with reference to FIG. 1, the wearable computing device processor(s) 110 may be configured with processor-executable instructions to receive audio signals from the one or more microphone(s) 104*a*, 104*b*, muscle movement detectors 102*a*, 102*b*, and one or more input mechanisms 106 (e.g., buttons). These sensors (i.e., microphones, head muscle movement detectors, and input mechanisms) may be used as means for receiving signals and/or indications. The processor(s) 110 may be used as means for determining conditions/triggers, such as whether patterns match or as means for determining whether to wake the computationally intensive operations (e.g., voice recognition processing) on a separate processor the same processor or some combination thereof according to the various embodiment methods described above. The processor(s) 110 may be coupled to one or more internal memories 112, that may be used as means for storing characteristic pattern data. Internal memories 112 may be volatile or non-volatile memories, and may also be secure and/or encrypted memories, or unsecure and/or unencrypted memories, or any combination thereof. The processor(s) 110 may be any programmable microprocessor, microcomputer or multiple processor chip or chips that can be configured by software instructions (i.e., applications) to perform a variety of functions, including the functions of the various embodiments described above. Multiple processors 110 may be included in a computing device, such as one processor dedicated to one or more functions and another one or more processors dedicated to running other applications/functions. Typically, software applications may be stored in the internal memory before they are accessed and loaded into the processor(s). The processor(s) 110 may include internal memory sufficient to store the application software instructions. For the purposes of this description, a general reference to memory refers to memory accessible by the processor(s) 110 including internal memory 112, removable memory (not shown) that may be plugged into the wearable computing device and memory within the processor.

In one or more exemplary embodiments, the functions described may be implemented in hardware, software, firmware, or any combination thereof. If implemented in software, the functions may be stored as one or more instructions or code on a non-transitory computer readable storage medium or non-transitory processor-readable storage medium. The steps of a method or algorithm may be embodied in a processor-executable software module which may reside on a non-transitory computer readable or processor-readable storage medium. Non-transitory computer readable or processor-readable storage media may be any storage media that may be accessed by a computer or a processor. By way of example but not limitation, such non-transitory computer readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer readable and processor-readable media. Additionally, the operations of a method or algorithm may reside as one or any combination or set of codes and/or instructions on a non-transitory processor-readable medium and/or computer readable medium, which may be incorporated into a computer program product.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order.

Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular. Additionally, as used herein and particularly in the claims, "comprising" has an open-ended meaning, such that one or more additional unspecified elements, steps and aspects may be further included and/or present.

The various illustrative logical blocks, modules, circuits, and process flow diagram blocks described in connection with the embodiments may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of controlling a speech recognition process of a computing device, comprising:
- receiving audio signals from a microphone;
- receiving head muscle activity signals from a muscle movement detector configured and positioned to measure head muscle activity of a user of the computing device contemporaneously with receiving audio signals from the microphone;
- determining whether the audio signals satisfy an audio characteristic criterion indicative of the user directing audio commands to the computing device, wherein the audio characteristic criterion comprises a first root mean square (RMS) threshold level indicative of the user directing audio commands to the computing device;
- determining whether the head muscle activity signals satisfy a muscle movement criterion indicative of the user of the computing device speaking;
- processing the audio signals through a voice recognition algorithm in response to determining both that the audio signals satisfy an audio characteristic criterion indicative of the user directing audio commands to the computing device and that the head muscle activity signals satisfy a muscle movement criterion indicative of the user of the computing device speaking, wherein the audio signals satisfy the audio characteristic criterion when an RMS level of the audio signals does not exceed the first RMS threshold level; and
- not processing the audio signals through the voice recognition algorithm while either the audio signals do not satisfy an audio characteristic criterion indicative of the user directing audio commands to the computing device or the head muscle activity signals do not satisfy a muscle movement criterion indicative of the user of the computing device speaking, wherein the audio signals do not satisfy the audio characteristic criterion when the RMS level of the audio signals exceeds the first RMS threshold level.

2. The method of claim 1, wherein determining whether the audio signals satisfy an audio characteristic criterion indicative of the user directing audio commands to the computing device comprises:
- comparing the audio signals to characteristic tonal patterns of speech;
- determining whether the audio signals match the characteristic tonal patterns of speech to a degree that exceeds a tonal-pattern matching threshold; and
- determining that the audio signals satisfy an audio characteristic criterion indicative of the user of the computing device speaking in response to determining that the audio signals match the characteristic tonal patterns of speech to a degree that exceeds the tonal-pattern matching threshold.

3. The method of claim 1, wherein determining whether the head muscle activity signals satisfy a muscle movement criterion indicative of the user of the computing device speaking comprises determining whether the head muscle activity signals exceeds a muscle movement signal magnitude threshold indicative of speech.

4. The method of claim 1, wherein determining whether the head muscle activity signals satisfy a muscle movement criterion indicative of the user of the computing device speaking comprises:
- comparing the head muscle activity signals to muscle movement signal patterns indicative of the user of the computing device speaking;
- determining whether the head muscle activity signals match the muscle movement signal patterns indicative of the user of the computing device speaking to a degree that exceeds a muscle activity-pattern matching threshold; and
- determining that the head muscle activity signals satisfy a muscle movement criterion indicative of the user of the computing device speaking in response to determining that the head muscle activity signals match the muscle movement signal patterns indicative of the user of the computing device speaking to a degree that exceeds the muscle activity-pattern matching threshold.

5. The method of claim 4, wherein the muscle movement signal patterns indicative of the user of the computing device speaking comprise head muscle activity signals learned from training by the user and stored in memory of the computing device.

6. A computing device, comprising:
- a memory;
- a microphone;
- a muscle movement detector; and
- a processor coupled to the memory, the microphone, and the muscle movement detector, wherein the processor is configured with processor-executable instructions to perform operations comprising:
  - receiving audio signals from the microphone;
  - receiving head muscle activity signals from the muscle movement detector configured and positioned to measure head muscle activity of a user of the computing device contemporaneously with receiving audio signals from the microphone;
  - determining whether the audio signals satisfy an audio characteristic criterion indicative of the user directing audio commands to the computing device, wherein the audio characteristic criterion comprises a first root mean square (RMS) threshold level indicative of the user directing audio commands to the computing device;

determining whether the head muscle activity signals satisfy a muscle movement criterion indicative of the user of the computing device speaking;

processing the audio signals through a voice recognition algorithm in response to determining both that the audio signals satisfy an audio characteristic criterion indicative of the user directing audio commands to the computing device and that the head muscle activity signals satisfy a muscle movement criterion indicative of the user of the computing device speaking, wherein the audio signals satisfy the audio characteristic criterion when an RMS level of the audio signals does not exceed the first RMS threshold level; and not processing the audio signals through the voice recognition algorithm while either the audio signals do not satisfy an audio characteristic criterion indicative of the user directing audio commands to the computing device or the head muscle activity signals do not satisfy a muscle movement criterion indicative of the user of the computing device speaking, wherein the audio signals do not satisfy the audio characteristic criterion when the RMS level of the audio signals exceeds the first RMS threshold level.

7. The computing device of claim 6, wherein the processor is configured with processor-executable instructions to perform operations such that determining whether the audio signals satisfy an audio characteristic criterion indicative of the user directing audio commands to the computing device comprises:

comparing the audio signals to characteristic tonal patterns of speech;

determining whether the audio signals match the characteristic tonal patterns of speech to a degree that exceeds a tonal-pattern matching threshold; and determining that the audio signals satisfy an audio characteristic criterion indicative of the user of the computing device speaking in response to determining that the audio signals match the characteristic tonal patterns of speech to a degree that exceeds the tonal-pattern matching threshold.

8. The computing device of claim 6, wherein the processor is configured with processor-executable instructions to perform operations such that determining whether the head muscle activity signals satisfy a muscle movement criterion indicative of the user of the computing device speaking comprises determining whether the head muscle activity signals exceeds a muscle movement signal magnitude threshold indicative of speech.

9. The computing device of claim 6, wherein the processor is configured with processor-executable instructions to perform operations such that determining whether the head muscle activity signals satisfy a muscle movement criterion indicative of the user of the computing device speaking comprises:

comparing the head muscle activity signals to muscle movement signal patterns indicative of the user of the computing device speaking;

determining whether the head muscle activity signals match the muscle movement signal patterns indicative of the user of the computing device speaking to a degree that exceeds a muscle activity-pattern matching threshold; and determining that the head muscle activity signals satisfy a muscle movement criterion indicative of the user of the computing device speaking in response to determining that the head muscle activity signals match the muscle movement signal patterns indicative of the user of the computing device speaking to a degree that exceeds the muscle activity-pattern matching threshold.

10. The computing device of claim 9, wherein the processor is configured with processor-executable instructions to perform operations such that the muscle movement signal patterns indicative of the user of the computing device speaking comprise head muscle activity signals learned from training by the user and stored in the memory of the computing device.

11. A computing device, comprising:

means for receiving audio signals from a microphone;

means for receiving head muscle activity signals from a muscle movement detector configured and positioned to measure head muscle activity of a user of the computing device contemporaneously with receiving audio signals from the microphone;

means for determining whether the audio signals satisfy an audio characteristic criterion indicative of the user directing audio commands to the computing device, wherein the audio characteristic criterion comprises a first root mean square (RMS) threshold level indicative of the user directing audio commands to the computing device;

means for determining whether the head muscle activity signals satisfy a muscle movement criterion indicative of the user of the computing device speaking;

means for processing the audio signals through a voice recognition algorithm in response to determining both that the audio signals satisfy an audio characteristic criterion indicative of the user directing audio commands to the computing device and that the head muscle activity signals satisfy a muscle movement criterion indicative of the user of the computing device speaking, wherein the audio signals satisfy the audio characteristic criterion when an RMS level of the audio signals does not exceed the first RMS threshold level; and means for not processing the audio signals through the voice recognition algorithm while either the audio signals do not satisfy an audio characteristic criterion indicative of the user directing audio commands to the computing device or the head muscle activity signals do not satisfy a muscle movement criterion indicative of the user of the computing device speaking, wherein the audio signals do not satisfy the audio characteristic criterion when the RMS level of the audio signals exceeds the first RMS threshold level.

12. The computing device of claim 11, wherein means for determining whether the audio signals satisfy an audio characteristic criterion indicative of the user directing audio commands to the computing device comprises:

means for comparing the audio signals to characteristic tonal patterns of speech;

means for determining whether the audio signals match the characteristic tonal patterns of speech to a degree that exceeds a tonal-pattern matching threshold; and means for determining that the audio signals satisfy an audio characteristic criterion indicative of the user of the computing device speaking in response to determining that the audio signals match the characteristic tonal patterns of speech to a degree that exceeds the tonal-pattern matching threshold.

13. The computing device of claim 11, wherein means for determining whether the head muscle activity signals satisfy a muscle movement criterion indicative of the user of the computing device speaking comprises means for determining whether the head muscle activity signals exceeds a muscle movement signal magnitude threshold indicative of speech.

14. The computing device of claim 11, wherein means for determining whether the head muscle activity signals satisfy a muscle movement criterion indicative of the user of the computing device speaking comprises:

means for comparing the head muscle activity signals to muscle movement signal patterns indicative of the user of the computing device speaking;

means for determining whether the head muscle activity signals match the muscle movement signal patterns indicative of the user of the computing device speaking to a degree that exceeds a muscle activity-pattern matching threshold; and means for determining that the head muscle activity signals satisfy a muscle movement criterion indicative of the user of the computing device speaking in response to determining that the head muscle activity signals match the muscle movement signal patterns indicative of the user of the computing device speaking to a degree that exceeds the muscle activity-pattern matching threshold.

15. The computing device of claim 14, wherein the muscle movement signal patterns indicative of the user of the computing device speaking comprise head muscle activity signals learned from training by the user and stored in memory of the computing device.

16. A non-transitory processor-readable medium having stored thereon processor-executable instructions configured to cause a processor of a computing device to perform operations comprising:

receiving audio signals from a microphone;

receiving head muscle activity signals from a muscle movement detector configured and positioned to measure head muscle activity of a user of the computing device contemporaneously with receiving audio signals from the microphone;

determining whether the audio signals satisfy an audio characteristic criterion indicative of the user directing audio commands to the computing device, wherein the audio characteristic criterion comprises a first root mean square (RMS) threshold level indicative of the user directing audio commands to the computing device;

determining whether the head muscle activity signals satisfy a muscle movement criterion indicative of the user of the computing device speaking;

processing the audio signals through a voice recognition algorithm in response to determining both that the audio signals satisfy an audio characteristic criterion indicative of the user of the computing device speaking and that the head muscle activity signals satisfy a muscle movement criterion indicative of the user directing audio commands to the computing device, wherein the audio signals satisfy the audio characteristic criterion when an RMS level of the audio signals does not exceed the first RMS threshold level; and not processing the audio signals through the voice recognition algorithm while either the audio signals do not satisfy an audio characteristic criterion indicative of the user directing audio commands to the computing device or the head muscle activity signals do not satisfy a muscle movement criterion indicative of the user of the computing device speaking, wherein the audio signals do not satisfy the audio characteristic criterion when the RMS level of the audio signals exceeds the first RMS threshold level.

17. The non-transitory processor-readable medium of claim 16, wherein the stored processor-executable instructions are configured to cause the computing device to perform operations such that determining whether the audio signals satisfy an audio characteristic criterion indicative of the user directing audio commands to the computing device comprises:

comparing the audio signals to characteristic tonal patterns of speech;

determining whether the audio signals match the characteristic tonal patterns of speech to a degree that exceeds a tonal-pattern matching threshold; and determining that the audio signals satisfy an audio characteristic criterion indicative of the user of the computing device speaking in response to determining that the audio signals match the characteristic tonal patterns of speech to a degree that exceeds the tonal-pattern matching threshold.

18. The non-transitory processor-readable medium of claim 16, wherein the stored processor-executable instructions are configured to cause the computing device to perform operations such that determining whether the head muscle activity signals satisfy a muscle movement criterion indicative of the user of the computing device speaking comprises determining whether the head muscle activity signals exceeds a muscle movement signal magnitude threshold indicative of speech.

19. The non-transitory processor-readable medium of claim 16, wherein the stored processor-executable instructions are configured to cause the computing device to perform operations such that determining whether the head muscle activity signals satisfy a muscle movement criterion indicative of the user of the computing device speaking comprises:

comparing the head muscle activity signals to muscle movement signal patterns indicative of the user of the computing device speaking;

determining whether the head muscle activity signals match the muscle movement signal patterns indicative of the user of the computing device speaking to a degree that exceeds a muscle activity-pattern matching threshold; and determining that the head muscle activity signals satisfy a muscle movement criterion indicative of the user of the computing device speaking in response to determining that the head muscle activity signals match the muscle movement signal patterns indicative of the user of the computing device speaking to a degree that exceeds the muscle activity-pattern matching threshold.

20. The non-transitory processor-readable medium of claim 19, wherein the stored processor-executable instructions are configured to cause the computing device to perform operations such that the muscle movement signal patterns indicative of the user of the computing device speaking comprise head muscle activity signals learned from training by the user and stored in memory of the computing device.

* * * * *